March 4, 1958 W. D. ALLISON 2,825,576
TORSIONAL SPRING SUSPENSION FOR MOTOR VEHICLES
Filed Feb. 10, 1955 3 Sheets-Sheet 1
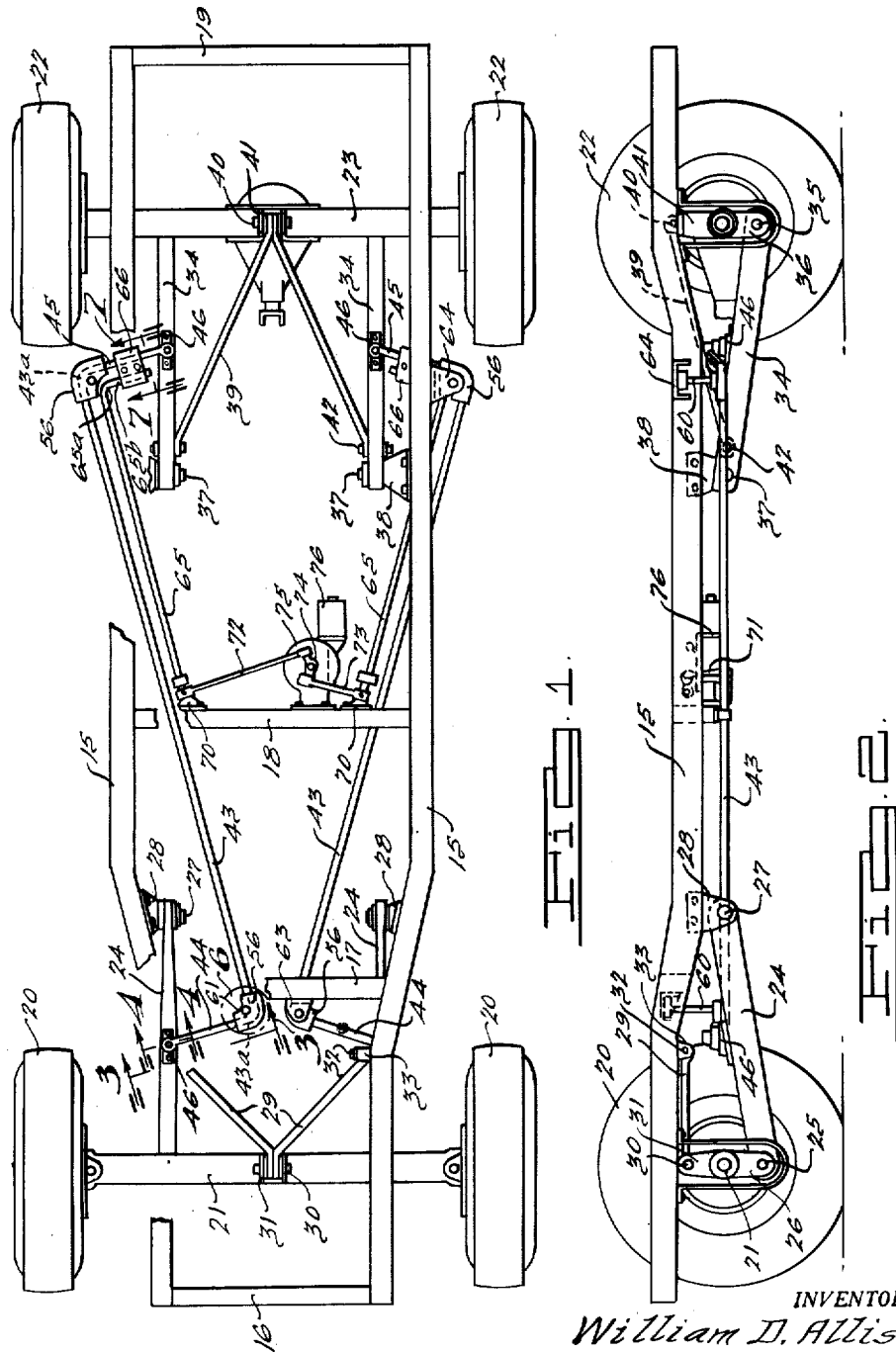
INVENTOR.
William D. Allison,
BY
Elmer Jannson Gray
ATTORNEY.

March 4, 1958     W. D. ALLISON     2,825,576
TORSIONAL SPRING SUSPENSION FOR MOTOR VEHICLES
Filed Feb. 10, 1955     3 Sheets-Sheet 2
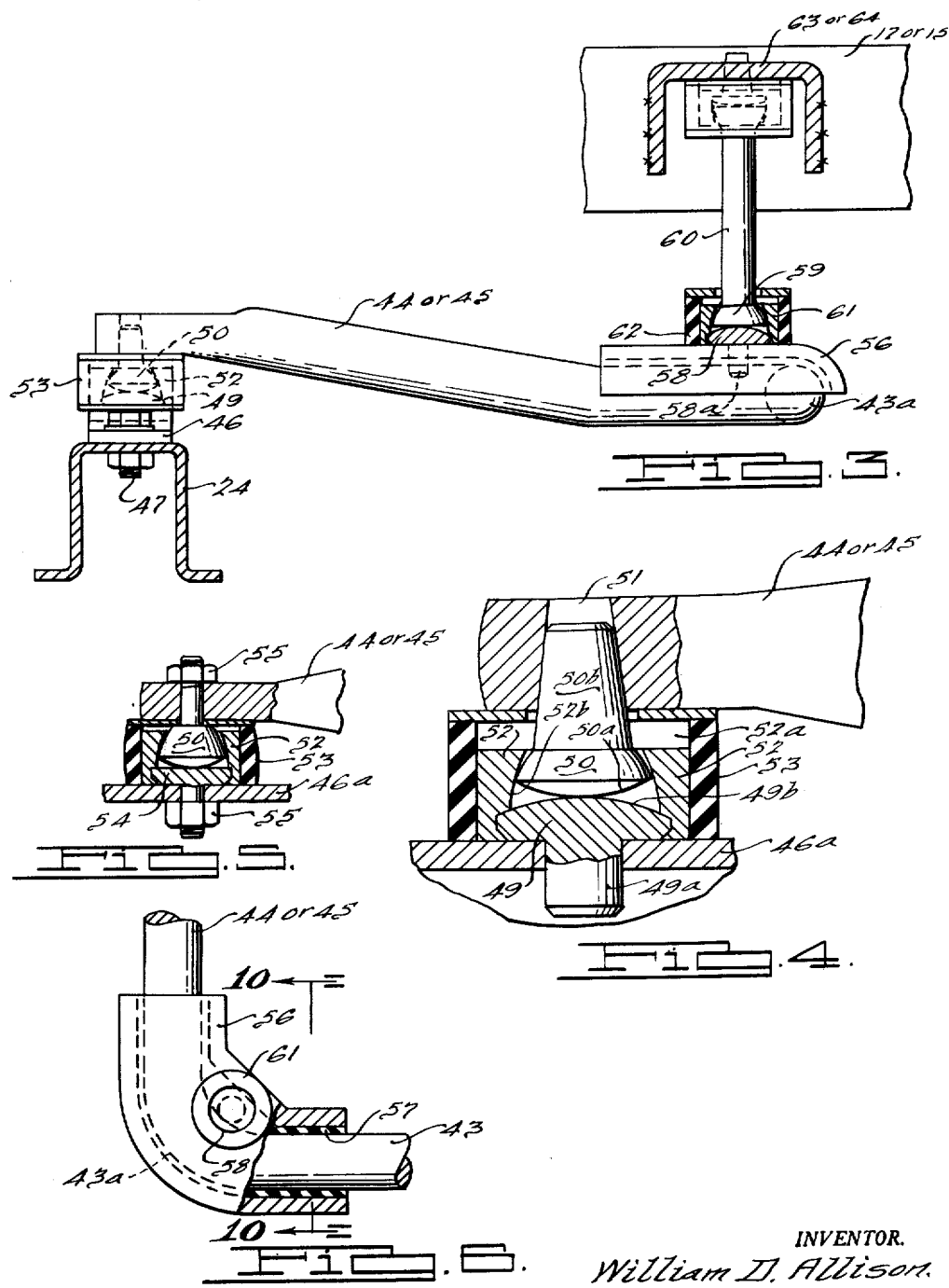
INVENTOR.
William D. Allison
BY Elmer Jamison Gray
ATTORNEY.

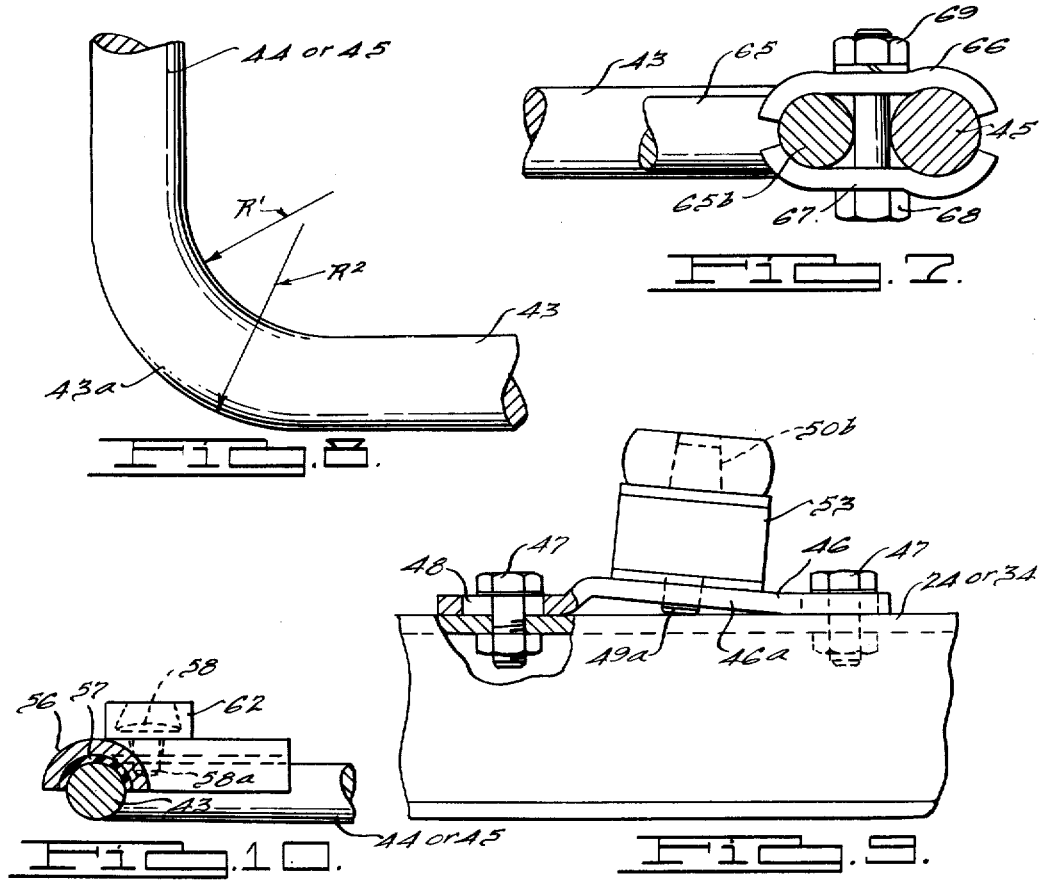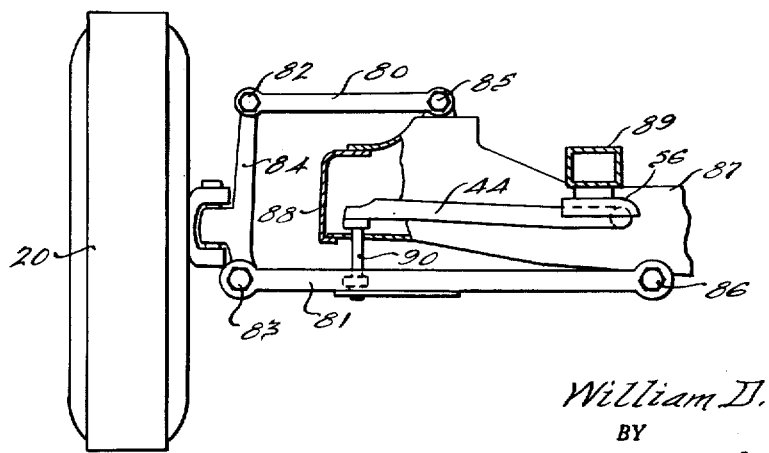

United States Patent Office 2,825,576
Patented Mar. 4, 1958

2,825,576

TORSIONAL SPRING SUSPENSION FOR MOTOR VEHICLES

William D. Allison, Grosse Pointe Farms, Mich.

Application February 10, 1955, Serial No. 487,243

28 Claims. (Cl. 280—104)

This invention relates to motor vehicles and particularly to spring suspensions therefor. The invention is applicable to various types of motor vehicles such as automobiles of the so-called pleasure or passenger types, busses, trucks, ambulances and commercial vehicles.

One of the principal objects of the invention is to provide a spring suspension for a motor vehicle capable of providing smooth riding characteristics under various conditions of vehicle operation, maintaining the vehicle substantially level at all times, increasing the comfort of the passengers regardless of rough roads over which the vehicle may travel, and rendering the vehicle relatively safe to handle on curves and over rough terrain while also reducing materially stresses and strains to which the frame is subjected under operating conditions.

The vehicle is provided with front and rear wheels and a main spring suspension or spring means interposed between the frame or body structure of the vehicle and the wheels. As a main spring means I utilize longitudinal torsion bars or torsional spring means preferably connecting each pair of front and rear wheels at a side of the vehicle in such manner as to enable vertical forces to be transmitted in corresponding directions to the vehicle frame adjacent opposite ends thereof in response to vertical motion of either wheel. In addition to the main spring suspension there is provided a load compensating means, which in the present instance comprises torsion bars or torsional springs, operable to supplement or modify the spring effort or resistance of the main spring means so as to levelize the frame under conditions where an increase in static load is placed at one or either end of the vehicle.

A further object of the present invention is to provide an improved, simplified and more economical spring suspension for a vehicle wherein the longitudinal torsion bars or torsional springs of the suspension are bent at their ends to provide angularly extending lever arms or levers connected to the wheels in such manner as to be responsive to up and down motion of the wheels effective to twist or angularly deflect the torsion bars.

An important feature of the illustrated embodiments resides in the provision of a main torsional spring means comprising preferably a pair of longitudinal torsion bars each common to a pair of front and rear wheels. For the purpose of rendering each bar responsive at opposite ends to vertical displacements of the wheels, resulting in torsional deflection of the bar in one direction or the other, the ends of the torsion bars are bent in opposite directions to form integral lever arms which in turn are connection at their ends to the wheels. These connections may be made to wheel axles, swinging torque arms attached to wheel axles or swinging independent wheel suspension arms depending upon the manner in which the vehicle wheels are connected to the frame.

A further feature or object of the invention is to provide improved load compensating spring means for the vehicle effective to modify or supplement the main spring means and compensate for changes in static load on the vehicle thereby to levelize the same. Such compensating spring means may comprise a pair of longitudinal torsion bars at the rear or front of the vehicle or at each end thereof, each compensating torsion bar being bent at an end thereof to provide an angularly disposed lever arm connected to and responsive to vertical displacement of a wheel. The opposite corresponding ends of the compensating bars have anchor points on the frame and are operatively connected to a power driven mechanism operable to simultaneously twist or torsionally deflect the compensating bars in opposed directions to increase or decrease the effective spring resistance at one or the other end of the vehicle thereby to maintain the vehicle frame level regardless of changes in static load thereon.

A further object of the invention is to provide a main longitudinal torsion bar and an associated longitudinal load compensating torsion bar, these bars having at corresponding ends laterally bent lever arms attached together so that up and down motion of one lever arm in response to corresponding motion of a wheel will be transmitted to the other lever arm whereby the torsion bars will be simultaneously torsionally deflected. On the other hand, power actuated compensating mechanism responsive to variations in static load on the vehicle is operable to torsionally twist the compensating torsion bar into various set or angularly adjusted positions without, however, affecting the spring rate of the associated main torsion bar. As a consequence, the compensating torsion bars will modify or supplement the action of the main torsion bars so as to increase or decrease the spring resistance effective to sustain varying static loads and thereby maintain the vehicle frame level.

Other objects of this invention will appear in the following description and appended claims, reference being had to the accompanying drawings forming a part of this specification wherein like reference characters designate corresponding parts in the several views.

Fig. 1 is a fragmentary plan view of a motor vehicle chassis provided with a vehicle spring suspension constructed in accordance with the present invention.

Fig. 2 is a side elevation of the construction shown in Fig. 1 with the wheels at one side of the vehicle omitted.

Fig. 3 is an enlarged vertical section taken substantially through lines 3—3 of Fig. 1 looking in the direction of the arrows.

Fig. 4 is an enlarged fragmentary vertical section taken substantially through lines 4—4 of Fig. 1 looking in the direction of the arrows.

Fig. 5 is a view generally similar to Fig. 4 but illustrating a modification.

Fig. 6 is an enlarged fragmentary plan view, partly in section, of the structure enclosed within the circle "6" in Fig. 1.

Fig. 7 is an enlarged fragmentary vertical section taken substantially through lines 7—7 of Fig. 1 looking in the direction of the arrows.

Fig. 8 is a fragmentary view of any one of the torsions bars illustrating the increase in the diameter or size of the bar at the bend thereof between the bar and its integrally formed lever arm.

Fig. 9 is an enlarged fragmentary elevation, partly in section, illustrating the connection between any one of the main torsion bar lever arms and the associated torque arm.

Fig. 10 is a fragmentary section taken substantially through lines 10—10 of Fig. 6 looking in the direction of the arrows.

Fig. 11 is a front end elevation, partly in section, showing the main torsion bar and the mounting thereof in connection with a conventional independent front wheel suspension.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the embodiment illustrated in Figs. 1 and 2 the front wheels and the rear wheels are supported by front and rear so-called solid-type axles. This construction is merely illustrative of one type of vehicle axle structure. However, it will be understood that the front wheels may be supported by conventional type upper and lower swinging suspension arms or levers to provide for independent front wheel motion, such as illustrated in the embodiment of Fig. 11. Moreover, the rear wheels may also be supported for independent motion, such as by means of swing axles or swinging suspension arms.

Referring to the accompanying drawings there is illustrated, by way of example, a vehicle chassis having front and rear road wheels supporting the frame or body through the medium of a torsional or torsion bar spring suspension. In the interest of clarity the vehicle superstructure or body and details of the power plant and drive mechanisms have been omitted from the drawings.

Referring particularly to Figs. 1 and 2, the chassis or body frame is shown, by way of example, as comprising spaced longitudinal sills or main side frame members 15 rigidly connected together by means of suitable cross frame members 16, 17, 18 and 19. The vehicle is provided with a pair of front dirigible wheels 20, which may be driven if desired, and connected together by means of a so-called solid-type axle 21. The vehicle is also provided with a pair of rear driven wheels 22 which in the present instance are also connected by means of a solid type axle 23.

With the front wheels 20 connected, by way of example, by means of axle 21 I prefer to provide a pair of rearwardly extending torque arms 24 pivoted at their front ends at 25 below the axle to hanger brackets 26 rigidly attached to and depending from the axle 21. The rear ends of the torque arms 24 are pivoted at 27 to brackets 28 rigidly attached to the side frame members 15.

In addition to the torque arms for the front axle I also preferably provide a pair of torque rods or struts 29 of wish bone construction. The struts 29 converge forwardly and meet at the apex thereof at a point midway of the front axle and these meeting ends have a common pivotal connection 30 to the upper end of a bracket 31 attached to and extending upwardly from the center of the axle. The pivotal connection at 30 preferably includes rubber or resilient means providing for a desired degree of yield or flexibility between the struts and the bracket 31. The rear ends of the wish bone struts 29 are pivotally and resiliently connected at 32 to brackets 33 attached to the frame side members.

At the rear of the vehicle I also prefer to provide longitudinally extending torque arms 34 pivoted at their rear ends at 35 at points below the axle 23 to hanger brackets 36 rigidly attached to the axle 23 and depending therefrom. The rear torque arms 34 extend forwardly from the axle, in the present instance in laterally spaced parallel relation, and the forward ends thereof are pivoted at 37 to brackets 38 rigidly attached to the frame side members 15. These rear torque arms, as shown in Fig. 2, incline upwardly from their rear to their front ends. In addition to the torque arms 34 I prefer to provide in conjunction therewith a pair of torque rods or struts 39 of wish bone construction. These struts converge rearwardly and meet at a point substantially midway of the rear axle. The rear meeting ends of the struts 39 have a common yieldable or resilient pivotal connection to the upper end of a bracket 41 rigidly attached to and extending upwardly from the center of the axle 23. The torque rods or struts 39 diverge forwardly and also are inclined downwardly from their rear to their front ends, as shown in Figs. 1 and 2, and the forward ends of these struts are pivoted at 42 to the torque arms 34 closely adjacent to the front pivotal connections of the torque arms.

The rear wish bone struts have the advantage in conjunction with the torque arms in creating a lifting force on the rear of the body or frame upon rapid acceleration, thus preventing what is commonly termed "squatting" of the rear of the body under such conditions. Since the wish bone struts at the front and rear are connected at the apices thereof to the axles at points above the axles, they assist in creating greater resistance to body roll which is especially advantageous in connection with vehicles, such as commercial vehicles, commonly utilizing front and rear solid axles and having relatively high centers of gravity. The points of connection of the wish bone struts to the axles, being fixed in lateral directions with relation to the ground, determine a longitudinal axis passing therethrough which is the body roll axis, and since this axis passing through one or both of the connections of the wish bone struts to the axle is above the axle the degree of body roll when negotiating curves will be appreciably reduced. The wish bone struts also assist in maintaining the relative lateral positions of the body or frame and axles, the rear wish bone struts also being effective to resist or absorb appreciably rear axle twist in one direction or the other by being placed in compression or tension.

The main spring suspension for the vehicle in the illustrated embodiment comprises a longitudinal torsion bar 43 connected to the front and rear wheels at each side of the vehicle. The main torsion bars 43 are preferably of solid construction and when installed are initially stressed by winding or twisting them angularly a predetermined amount such, for example, as 80° to 90°, so as to support the sprung weight of the vehicle with the desired road clearance under no load conditions. An important feature of the present invention resides in the provision of lever arms or levers integrally bent from the ends of the main torsion bars and by means of which the latter are connected to the wheels so as to respond to vertical displacement thereof during operation of the vehicle.

Each main torsion bar 43 is provided at each end with a generally right angular bend 43a forming as integral extensions of each main torsion bar a front angularly extending lever arm 44 and a rear angularly extending lever arm 45. It will be understood that each main torsion bar 43 is constructed in the same manner to provide front and rear lever arms or levers 44 and 45. In forming each bend 43a at the front and rear of each main torsion bar the structure of the torsion bar throughout the length of each bend is increased in diameter so as to incorporate in the bar added strength at these locations. Thus, as illustrated in Fig. 8, $R^1$ indicates the radius of curvature of the inner side of each bend 43a whereas $R^2$ indicates the radius of curvature of the outer side of each bend. By forming the bend on these two radii the diameter of the bar is increased throughout the length of the bend.

Since the main torsion bars 43 are mounted and function in the same manner it will be understood that the following description applicable to one torsion bar applies to the other. It will be noted that the front lever arm 44 of each main torsion bar extends outwardly from the bend 43a of the bar whereas the rear lever arm 45 of each main torsion bar extends inwardly from the rear bend 43a of the bar. The lever arms 44 and 45, therefore, extend from the main length of the torsion bar 43 in opposite directions. For the purpose of minimizing frictional resistance, improving operation and reducing the cost of construction, all connections between each main torsion bar and the vehicle frame and the front and rear torque arms are preferably in the form of rolling pivotal connections. Thus, the outer end of each lever arm 44 has a rolling pivotal connection with the associated front torque arm 24 and the inner end of each rear lever arm 45 has a rolling pivotal connection with the associated rear torque arm 34. In addition, each main torsion bar at the locality of the front and rear bends 43a thereof have rolling pivotal connections with the vehicle frame structure.

The connection between the outer end of each front lever arm 44 to the associated torque arm 24 is particularly illustrated in Figs. 3, 4 and 9. A bracket 46 is attached to the upper side of each torque arm 24 by means of bolts 47. These bolts extend through longitudinal adjusting slots 48 in the ends of the bracket which permit the bracket to be adjusted longitudinally of the torque arm to accommodate production variations in the main torsion bar. Since the torque arm is inclined each bracket 46 is offset to provide a horizontal supporting portion 46a. The shank or stem 49a of a hardened bearing member or stud 49 is rigidly secured within a hole in the bracket supporting portion 46a. The bearing member or stud 49 has an upper arcuate or curved bearing surface 49b engaged by the lower arcuate or curved bearing surface 50a of a hardened bearing stud or head 50 having a tapered shank or stem 50b rigidly secured within a tapered hole 51 in the outer end of the lever arm 44. The studs 49 and 50 are retained in rolling engagement by means of a cylindrical retainer ring 52 having a recess 52a receiving the bearing stud 50 for free pivotal motion in any direction. The angular side wall 52b is curved in a vertical direction so as to provide an upper side wall portion of the recess which overlies the stud or head 50 thereby preventing separation thereof from the bearing stud 49 while at the same time permitting free rolling motion of the head or stud 50 within the recess 52a. The curved side wall 52b has a generated surface of the generally involute type, this surface being generated in accordance with the rolling movement of the stud 50 on the stud 49 so as to permit substantially free rolling engagement between these parts with no appreciable frictional resistance by engagement of the stud 50 with the wall 52b while at the same time preventing separation of the parts. The bottom of the retainer ring 52 is recessed to receive the head or stud 49 and is spun underneath the outer edge of the head to anchor the retainer ring to the head 49. The parts 49, 50 and 52 are enclosed within a flexible annular casing 53 closed at its top and forming a grease seal.

In the modified construction shown in Fig. 5 the construction is similar to that shown in Fig. 4 expecting that the lower bearing stud 54, as distinguished from the lower bearing stud 49, has an upper flat hardened bearing surface upon which the bearing stud 50 rolls. In this construction also the shanks of the bearing studs are threaded and attached in place by means of nuts 55.

Although the foregoing description with reference to Figs. 3, 4 and 9 relates to the rolling pivotal connections between the outer ends of the front lever arms 44 and the front torque arms 24, it will be understood that the same construction, namely the identical parts 49—53, is embodied in the rolling pivotal connections between the inner ends of the rear lever arms 45 and the rear torque arms 34.

Referring to Figs. 1, 3, 6 and 10, there is provided at each bend 43a at the front and rear of each main torsion bar 43 a generally semi-spherical mounting cap or member 56. This member is angular in construction so as to fit over the angle bend of the torsion bar. A liner 57 of rubber or elastic material is interposed between each cap or member 56 and the upper section of the torsion bar along the length of the bend thereof and the parts may be secured together by bonding or otherwise. At the locality of each bend in the main torsion bar the latter has a rolling pivotal connection with the adjacent portion of the frame. With reference to Fig. 3 a lower hardened bearing stud 58 is provided and has a shank or stem 58a rigidly secured within a hole in the mounting member 56 midway of the bend in the torsion bar. The bearing stud 58 has an upper arcuate or curved bearing surface which is engaged by the lower flat bearing surface of an upper hardened bearing stud or head 59 integrally formed on or attached to the lower end of a vertical load link or strut 60. The bearing studs 58 and 59 are retained in free rolling contact by means of an annular retainer ring 61 which may be identical to the retainer ring 52. As in the case of the retainer ring 52, the retainer ring 61 has a recess receiving the stud 59 and formed with a curved side wall having a generated surface similar to the side wall 52b. The parts 58, 59 and 61 are also enclosed by a flexible casing 62 forming a grease seal.

With the exception of the flat lower bearing surface on the bearing stud 59, the rolling pivotal connection between the lower end of each strut 60 and each front and rear mounting member 56 is substantially the same as the construction shown in Fig. 4. The upper end of the load link or strut 60 at each front bend in the main torsion bars has a rolling pivotal connection with a bracket 63 attached to the cross frame member 17. This upper rolling pivotal connection between the strut 60 and the bracket 63, including the provision of the retainer ring 61 similar to the retainer ring 52, is identical to the corresponding construction at the lower end of the strut 60, excepting that it is reversed. Correspondingly, the upper end of each load link or strut 60 at each rear bend 43a of each main torsion bar has a rolling pivotal connection with a bracket 64 attached to the adjacent side frame member 15, such connection being the same as that shown in Fig. 3.

Since the front and rear lever arms 44 and 45 at each side of the vehicle extend in opposite or reversed directions, it will be seen that up and down movement of a front wheel or a rear wheel will result in angular torsional deflection of the main torsion bar 43 in directions opposite to the angular torsional deflection thereof produced by corresponding up and down movement of the other wheel at the same side of the vehicle. Either lever arm 44 or 45 is, therefore, effective to torsionally deflect angularly the torsion bar 43 in opposition to the other lever arm, thereby transmitting vertical forces in corresponding directions to the frame adjacent opposite ends thereof in response to vertical motion of either wheel.

In the present embodiment of the invention the main spring suspension comprising torsion bars 43 is supplemented by compensating means, preferably torsion spring bars, at each side of the vehicle, operable to vary or modify the spring effort or resistance of the main spring means so as to maintain the frame substantially level under conditions where changes in static load occur at one end or the other of the vehicle. In the present instance the compensating means is provided at the rear of the vehicle, although it may be duplicated at the front of the vehicle, and comprises a torsion bar 65 for each rear wheel. The spring torsion bars 65, as in the case of the main torsion bars 43, are selected as to cross sectional size and torsional characteristics to suit the particular vehicle, each compensating torsion bar being preferably of less diameter or cross sectional size than the associated main torsion bar since normally it is only required to exert appreciably less torsional resistance than the associated main torsion bar. In preferred practice the compensating torsional spring means may be torsionally deflected in one direction to supplement the main torsional spring means and increase the spring resistance at the rear wheels or may be deflected in the opposite direction either to decrease the spring resistance at the rear wheels or reduce the torsional effort exerted by the main torsional spring means.

In the present embodiment each compensating torsion bar 65 extends parallel to and alongside the main torsion bar 43 and the rear end is provided with a bend 65a so as to provide a generally right angularly extending lever arm 65b which extends inwardly and substantially parallel to the adjacent rear lever arm 45 of the main torsion bar. As in the case of the main torsion bar the bend 65a is increased in diameter in the same manner as described in connection with Fig. 8. The lever arm 65b of each compensating torsion bar is rigidly clamped to the adjacent lever arm 45. This may be accomplished, as shown in Fig. 7, by means of upper and lower clamps 66 and 67, respectively, having curved portions embracing the lever arms 65 and 45. The clamping members 66 and 67 are rigidly drawn together and clamped by means of a bolt 68 and nut 69. The forward end of each compensating torsion bar 65 has an anchor point on the cross frame member 18, the bar having a pilot end mounted to turn in a bearing in a bracket 70, this construction being the same as that shown and described in my copending application Serial No. 475,659.

Power actuated compensating mechanism, responsive to variations in static load on the vehicle, is provided for torsionally twisting or deflecting the forward ends of the compensating torsion bars into various set or angularly adjusted positions so as to increase or decrease the spring resistance effective to sustain various static loads. This mechanism may be substantially the same as that shown and described in my above noted copending application. Also, as shown and described in said application, this compensating mechanism is preferably automatically controlled by means of a delayed action compensator switch similar to that shown and described in my said application and controlled from one of the main torsion bars in the same manner. In general the compensating mechanism comprises levers 71 attached at their lower ends to the forward ends of the compensating torsion bars 65. The upper ends of these levers are pivotally connected to a pair of transmitting links 72 and 73, and the inner adjacent ends of these links are pivotally connected to a horizontally swinging lever 74 adapted to be rotated or swung in one direction or the other by means of a reduction gear unit 75 operated from an electric servomotor 76. Upon operation of the motor and the reduction gear unit the lever 74 will be swung in one direction or the other thereby shifting the links 72, 73 outwardly or inwardly and endwise so as to turn the levers 71 and twist the compensating torsion bars 65 in opposite directions predetermined amounts as determined by the necessary torsional deflection of these bars to compensate for static load changes and bring the frame to and maintain it at a level position.

In the embodiment of Fig. 11 the construction and operation of the main and compensating torsion bars are substantially the same as described above and shown with respect to Figs. 1 to 10 inclusive, excepting that the forward ends of the main torsion bars are applied to a conventional front independent wheel suspension.

Referring to Fig. 11, the front wheels are connected to the frame by means of supper and lower short and long vertically swinging suspension arms 80 and 81, respectively. As in conventional practice the outer ends of these suspension arms are pivoted at 82 and 83, respectively, to the upper and lower ends of a conventional wheel spindle mounting 84. The inner ends of the suspension arms 80 and 81 are pivoted at 85 and 86, respectively, to a frame cross member 87 attached at opposite ends to the main side frame members 88.

Each main torsion bar 43, as previously described, is bent to form the front lever arm 44. The mounting member 56 at each front bend of the main torsion bar in the embodiment of Fig. 11 has a rolling pivotal connection with a bracket 89 attached to the cross frame member 87. This rolling pivotal connection at the locality of the bend of the main torsion bar may be the same as that shown in Fig. 4 and described in connection therewith. The outer end of each front lever arm 44 of the main torsion bar in the embodiment of Fig. 11 is connected to the lower suspension arm 81 by means of a vertical strut or link 90. The upper end of this strut has a rolling pivotal connection with the outer end of the lever arm 44, and the lower end of the strut has a rolling pivotal connection with the lower suspension arm 81. These rolling pivotal connections at the upper and lower ends of the strut 90 may be the same as the rolling pivotal connections at the upper and lower ends of the strut 60 in the previous embodiment as particularly shown in Fig. 3.

It will be understood that the front torque arms 24 will swing up and down in response to vertical motion of the front axle consequent to vertical motion of the front wheels. This motion will be transmitted to the outer ends of the lever arms 44 resulting in torsionally deflecting or twisting the main torsion bar in one direction or the other throughout its length between the front and rear bends 43a thereof. The reaction of these forces consequent to the torsional deflection of the main torsion bars will be applied through the load links 60 and a minimum of frictional resistance will develop owing to the various rolling pivotal connections at the upper and lower ends of the load links and at the outer ends of the torsion bar lever arms. A similar action will occur upon vertical swinging motion of the rear torque arms 34 consequent to vertical motion of the rear axle and rear wheels. This motion will be transmitted through the rear lever arms 45 to the main torsion bars resulting in torsionally deflecting the same in one direction or the other, the reaction to such forces being taken through the rear load links 60 at the locality of the rear bends 43a of the main torsion bars. Vertical motion of the rear lever arms 45, transmitted thereto by the torque arms 34, will result in corresponding motion being transmitted to the rear lever arms 65b of the compensating torsion bars 65, thereby torsionally deflecting or twisting the same in one direction or the other.

From the foregoing it will be seen that each main torsion bar 43 is provided at the front and also the rear with a rolling pivotal or jointed connection with the frame means, preferably at each front and rear bend in the bar, and the lever arm bent angularly from the bar adjacent each end is also provided with a rolling pivotal or jointed connection with the wheel, such as through the medium of the swinging torque arm or a swinging wheel suspension arm. In each instance the joint at each rolling pivotal connection is retained against separation by a retainer ring attached to one, such as the lower, bearing member or stud of the connection. This retainer ring has a recess freely receiving the other, such as the upper bearing member or stud, and formed with a hardened generated curved annular side wall overlapping such other bearing member or stud. This consttruction provides an efficient, long lived anti-friction bearing or joint at each end of the strut 60 or 90 as well as at the outer end of each lever arm 44, 45 or at the connection 89 in Fig. 11. These rolling connections may comprise coacting hardened curved surfaces on the upper and lower bearing members or a hardened curved surface on one rolling upon a hardened flat surface on the other, it being understood that the rolling bearing and retainer constructions herein shown may be used interchangeably at all pivotal connections for the various torsion bars and the lever arms.

The retainer rings cooperate with the rolling bearing members to provide a minimum of diametral clearance thereby substantially eliminating objectionable chatter and noise and, hence, achieving quietness in operation. The retainer rings or members maintain the bearing members in constant engagement and prevent separation under tension loads, hence providing an important safety factor.

Where the term "torsion bar" is used herein it is to be understood that such term is intended to comprehend one or a plurality of torsion spring members or bars arranged and acting together in the manner of and constituting in effect a single unitary torsion bar means.

I claim:

1. In a vehicle structure having frame means, road wheels and axle means connecting said wheels, a spring suspension for said structure including torsion bar spring means, means for connecting said spring means to the frame means, a pair of swingable torque arms connecting said axle means and the frame means, lever arm means connecting said spring means with said torque arms, a pair of struts having adjacent meeting ends pivotally connected to the axle means at a locality thereabove, said struts extending in diverging relation from said locality, and means for pivotally connecting the opposite ends of said struts to said torque arms.

2. In a vehicle structure having frame means, road wheels and axle means connecting said wheels, a spring suspension for said structure including torsion bar spring means, means for connecting said spring means to the frame means, a pair of swingable torque arms connecting said axle means and the frame means, lever arm means connecting said spring means with said torque arms, a pair of struts having adjacent meeting ends pivotally connected to the axle means at a locality thereabove, said struts extending in diverging relation from said locality, and means for pivotally connecting the opposite ends of said struts to said frame means.

3. In a vehicle structure having frame means and front and rear wheels, longitudinally extending spring torsion bar means common to said wheels, said bar means having a bend adjacent an end thereof forming an angularly extending lever arm, means for connecting said bar means to the frame means at the locality of said bend, and means for connecting the lever arm to a wheel to swing up and down in response to vertical motion of the wheel and thereby torsionally deflect said bar means angularly, the connections between said bar means and the frame means and between said lever arm and the wheel includind rolling pivotal connections.

4. In a vehicle structure having frame means and front and rear wheels, longitudinally extending spring torsion bar means common to said wheels, said bar means having bends adjacent opposite ends thereof forming angularly extending lever arms, means for connecting said bar means to the frame means at the localities of said bends, and means for connecting each lever arm to a wheel to swing up and down in response to vertical motion of the wheel and thereby torsionally deflect said bar means angularly intermediate said bends, the connections between said bar means and the frame means and between said lever arms and the wheels including rolling pivotal connections.

5. In a vehicle structure having frame means and front and rear wheels, main spring means for said structure, a load compensating spring means including spring torsion bar means having an end bent to provide an angularly extending lever arm, means for connecting said lever arm to a wheel, load compensating means for torsionally deflecting said compensating spring means to vary the spring resistance at one end of the vehicle structure, and means including a rolling pivotal connection for connecting said spring torsion bar means to the frame means.

6. In a vehicle structure having frame means and front and rear wheels, longitudinally extending spring torsion bar means common to said wheels, said bar means having a bend adjacent an end thereof forming an angularly extending lever arm, a vertical strut interposed between said bend and the frame means, and means for connecting the end of said lever arm to a wheel, the ends of said strut having pivotal connections with said bend and frame means, at least one of said connections including upper and lower bearing members in rolling engagement with each other.

7. In a vehicle structure having frame means and front and rear wheels, longitudinally extending spring torsion bar means common to said wheels, said bar means having a bend adjacent an end thereof forming an angularly extending lever arm, a vertical strut interposed between said bend and the frame means, means for connecting the end of said lever arm to a wheel, the ends of said strut having pivotal connections with said bend and frame means, at least one of said connections including upper and lower bearing members in rolling engagement with each other, and means for retaining said bearing members in rolling engagement against separation.

8. In a vehicle structure having frame means and front and rear wheels, longitudinally extending spring torsion bar means common to said wheels, said bar means having a bend adjacent an end thereof forming an angularly extending lever arm, a vertical strut interposed between said bend and the frame means, means for connecting the end of said lever arm to a wheel, the ends of said strut having pivotal connections with said bend and frame means, at least one of said connections including upper and lower bearing members in rolling engagement with each other, and means for retaining said bearing members in rolling engagement against separation, at least one of said bearing members having a curved bearing surface engaging a bearing surface on the other bearing member.

9. In a vehicle structure having frame means and road wheels, a spring suspension for said structure including torsion bar spring means, a connection between said spring means and the frame means, a lever arm connection between said spring means and a wheel, at least one of said connections including upper and lower bearing members in rolling engagement with each other, and means for retaining said members in rolling engagement against separation, said retaining means comprising a retainer ring attached to one of said bearing members and having a recess receiving the other bearing member, said recess being formed with a curved side wall overlapping said other bearing member.

10. A vehicle structure according to claim 3 in which the connection between the lever arm and the wheel includes a vertically swinging torque arm connected at one end to the wheel and at its opposite end to the frame means.

11. A vehicle structure according to claim 3 comprising a second spring torsion bar means extending alongside said first named torsion bar means and having an end bent laterally to provide a lever arm, and means for connecting said lever arms together to swing in unison.

12. A vehicle structure according to claim 3 comprising a second spring torsion bar means extending alongside said first named torsion bar means and having an end bent laterally to provide a lever arm, means for connecting said lever arms together to swing in unison, and load compensating means for torsionally deflecting angularly said second torsion bar means to vary the spring resistance at an end of the vehicle structure.

13. A vehicle structure according to claim 3 comprising a second spring torsion bar means having an end bent laterally to provide a lever arm, and means for connecting said lever arms together to swing in unison.

14. A vehicle structure according to claim 4 in which the connection between the lever arm and the wheel includes a vertically swinging torque arm connected at one end to the wheel and at its opposite end to the frame means.

15. A vehicle structure according to claim 4 comprising a second spring torsion bar means extending alongside said first named torsion bar means and having an end bent laterally to provide a lever arm, and means for connecting said lever arms together to swing in unison.

16. A vehicle structure according to claim 4 comprising a second spring torsion bar means extending alongside said first named torsion bar means and having an end bent laterally to provide a lever arm, means for connecting said lever arms together to swing in unison, and load compensating means for torsionally deflecting angularly said second torsion bar means to vary the spring resistance at an end of the vehicle structure.

17. A vehicle structure according to claim 4 comprising a second spring torsion bar means having an end bent laterally to provide a lever arm, and means for connecting said lever arms together to swing in unison.

18. A vehicle structure according to claim 4 comprising a second spring torsion bar means having an end bent laterally to form a lever arm, means for connecting said last named lever arm to one of said first named lever arms, and load compensating means for torsionally deflecting said second torsion bar means to vary the spring resistance at one end of the vehicle structure.

19. A vehicle structure according to claim 6 comprising a second spring torsion bar means extending alongside said first named torsion bar means and having an end bent laterally to provide a lever arm, and means for connecting said lever arms together to swing in unison.

20. A vehicle structure according to claim 6 comprising a second spring torsion bar means extending alongside said first named torsion bar means and having an end bent laterally to provide a lever arm, means for connecting said lever arms together to swing in unison, and load compensating means for torsionally deflecting angularly said second torsion bar means to vary the spring resistance at an end of the vehicle structure.

21. A vehicle structure according to claim 6 comprising a second spring torsion bar means having an end bent laterally to provide a lever arm, and means for connecting said lever arms together to swing in unison.

22. In a vehicle structure having frame means and front and rear wheels, longitudinally extending spring torsion bar means common to said wheels, said bar means having an end thereof bent laterally to provide a lever arm, means for connecting said lever arm to a wheel to swing up and down in response to vertical motion of the wheel and thereby torsionally deflect said bar means angularly, a second spring torsion bar means extending alongside said first named torsion bar means and having an end bent laterally to provide a lever arm, and means for connecting said lever arms together to swing in unison.

23. In a vehicle structure having frame means and front and rear wheels, longitudinally extending spring torsion bar means common to said wheels, said bar means having an end thereof bent laterally to provide a lever arm, means for connecting said lever arm to a wheel to swing up and down in response to vertical motion of the wheel and thereby torsionally deflect said bar means angularly, a second spring torsion bar means extending alongside said first named torsion bar means and having an end bent laterally to provide a lever arm, means for connecting said lever arms together to swing in unison, and load compensating means for torsionally deflecting angularly said second torsion bar means to vary the spring resistance at an end of the vehicle structure.

24. In a vehicle structure having frame means and front and rear wheels, longitudinally extending spring torsion bar means common to said wheels, said bar means having a bend adjacent an end thereof forming an angularly extending lever arm, means for connecting said bar means to the frame means at the locality of said bend, means for connecting the lever arm to a wheel to swing up and down in response to vertical motion of the wheel and thereby torsionally deflect said bar means angularly, a second spring torsion bar means having an end bent laterally to provide a lever arm, and means for connecting said lever arms together to swing in unison.

25. In a vehicle structure having frame means and front and rear wheels, longitudinally extending spring torsion bar means common to said wheels, said bar means having bends adjacent opposite ends thereof forming angularly extending lever arms, means for connecting said bar means to the frame means at the localities of said bends, means for connecting each lever arm to a wheel to swing up and down in response to vertical motion of the wheel and thereby torsionally deflect said bar means angularly intermediate said bends, a second spring torsion bar means having a end bent laterally to form a lever arm, means for connecting said last named lever arm to one of said first named lever arms, and load compensating means for torsionally deflecting said second torsion bar means to vary the spring resistance at one end of the vehicle structure.

26. In a vehicle structure having frame means and front and rear wheels, longitudinally extending spring torsion bar means common to said wheels, said bar means having a bend adjacent an end thereof forming an angularly extending lever arm, a vertical strut interposed between said bend and the frame means, means for connecting the end of said lever arm to a wheel, the connection between the end of the lever arm and wheel including upper and lower bearing members in rolling engagement with each other.

27. In a vehicle structure having frame means and front and rear wheels, longitudinally extending spring torsion bar means common to said wheels, said bar means having a bend adjacent an end thereof forming an angularly extending lever arm, a vertical strut interposed between said bend and the frame means, means for connecting the end of said lever arm to a wheel, the connection between the end of the lever arm and wheel including upper and lower bearing members in rolling engagement with each other, and means for retaining said bearing members in rolling engagement against separation.

28. In a vehicle structure having frame means and front and rear wheels, longitudinally extending spring torsion bar means common to said wheels, said bar means having a bend adjacent an end thereof forming an angularly extending lever arm, a vertical strut interposed between said bend and the frame means, means for connecting the end of said lever arm to a wheel, the connection between the end of the lever arm and wheel including upper and lower bearing members in rolling engagement with each other, and means for retaining said bearing members in rolling engagement against separation, at least one of said bearing members having a curved bearing surface engaging a bearing surface on the other bearing member.

References Cited in the file of this patent

UNITED STATES PATENTS

| 2,607,611 | Allison | Aug. 19, 1952 |
| 2,621,058 | Oster | Dec. 9, 1952 |

FOREIGN PATENTS

| 555,388 | Great Britain | Aug. 20, 1943 |
| 188,754 | Switzerland | Apr. 1, 1937 |